(12) United States Patent
Cook

(10) Patent No.: US 12,129,033 B2
(45) Date of Patent: Oct. 29, 2024

(54) AIRCRAFT RESTRAINT SYSTEM WITH HAPTIC SIGNALING

(71) Applicant: Textron Innovations Inc., Providence, RI (US)

(72) Inventor: Charles Irving Cook, Rockwall, TX (US)

(73) Assignee: Textron Innovations Inc., Providence, RI (US)

( * ) Notice: Subject to any disclaimer, the term of this patent is extended or adjusted under 35 U.S.C. 154(b) by 75 days.

(21) Appl. No.: 18/045,267

(22) Filed: Oct. 10, 2022

(65) Prior Publication Data

US 2024/0116635 A1 Apr. 11, 2024

(51) Int. Cl.
*G08G 1/00* (2006.01)
*B64D 11/06* (2006.01)
*B64D 45/06* (2006.01)

(52) U.S. Cl.
CPC ............ *B64D 11/062* (2014.12); *B64D 45/06* (2013.01)

(58) Field of Classification Search
CPC .............................. B64D 11/062; B64D 45/06
USPC .......................................................... 340/901
See application file for complete search history.

(56) References Cited

U.S. PATENT DOCUMENTS

| | | | |
|---|---|---|---|
| 5,813,989 A * | 9/1998 | Saitoh ................ | B60H 1/00742 340/576 |
| 6,671,618 B2 | 12/2003 | Hoisko | |
| 10,663,316 B2 | 5/2020 | Hu et al. | |
| 10,710,725 B2 * | 7/2020 | Sinusas ................ | B64D 11/062 |
| 2008/0120029 A1 | 5/2008 | Zelek et al. | |
| 2009/0309346 A1 * | 12/2009 | Van Druff ............... | B60R 22/26 280/806 |
| 2010/0328051 A1 | 12/2010 | Hale et al. | |
| 2013/0190990 A1 * | 7/2013 | Haidar .................... | B60R 22/34 701/45 |
| 2013/0218456 A1 | 8/2013 | Zelek et al. | |

(Continued)

FOREIGN PATENT DOCUMENTS

CN 218106325 * 12/2022

OTHER PUBLICATIONS

Design News, "Tiny Valves Orient Pilots," Feb. 18, 2002, 9 pages.

(Continued)

*Primary Examiner* — Tai T Nguyen
(74) *Attorney, Agent, or Firm* — Fogarty LLP

(57) ABSTRACT

A tactile signal seat belt sleeve has tactile signal producing elements arrayed along a sleeve that is adapted to fit over a seat belt for a vehicle, such as an aircraft. The elements may be arranged, for example, along the body-facing side of the belt. Each sleeve incorporates a signal-receiving element that allows for the activation of vibration-producing motors embedded in the fabric of the seat belt sleeve or belting. Vibration motors, such as piezoelectric devices, can be used to produce the tactile feedback. The haptic feedback assembly is connected to an interface unit that uses data from aircraft systems to sense, for example, the aircraft altitude and pitch, roll and yaw system. The interface unit generates signal to haptic devices to create appropriate vibrations patterns to the sleeve. The vibrations may be used to indicate directions of turn using output signals from various navigations systems.

20 Claims, 10 Drawing Sheets

(56) References Cited

U.S. PATENT DOCUMENTS

| | | | |
|---|---|---|---|
| 2013/0249262 A1* | 9/2013 | Herman | G08B 6/00 |
| | | | 340/963 |
| 2014/0015651 A1 | 1/2014 | Ur | |
| 2015/0356889 A1* | 12/2015 | Schwartz | G09B 21/009 |
| | | | 340/4.12 |
| 2016/0107570 A1* | 4/2016 | Modarres | B62D 15/029 |
| | | | 340/435 |
| 2016/0355157 A1* | 12/2016 | Cech | A44B 11/2561 |
| 2018/0297554 A1* | 10/2018 | Ortiz | B60R 22/12 |
| 2021/0347323 A1* | 11/2021 | Thomas | B60R 21/01538 |
| 2022/0287909 A1* | 9/2022 | Sanchez Solana | G16H 20/60 |

OTHER PUBLICATIONS

Embry-Riddle Aeronautical University—Newsroom, "Vibrating Vest Helps Combat Flight Deck Disorientation," Sep. 25, 2019, 6 pages.
Office of Navy Research, "Landing On His Feet," 2001, 1 page.
Sbir.gov, "Tactile Situational Awareness System (TSAS)," 2007, 3 pages.

* cited by examiner

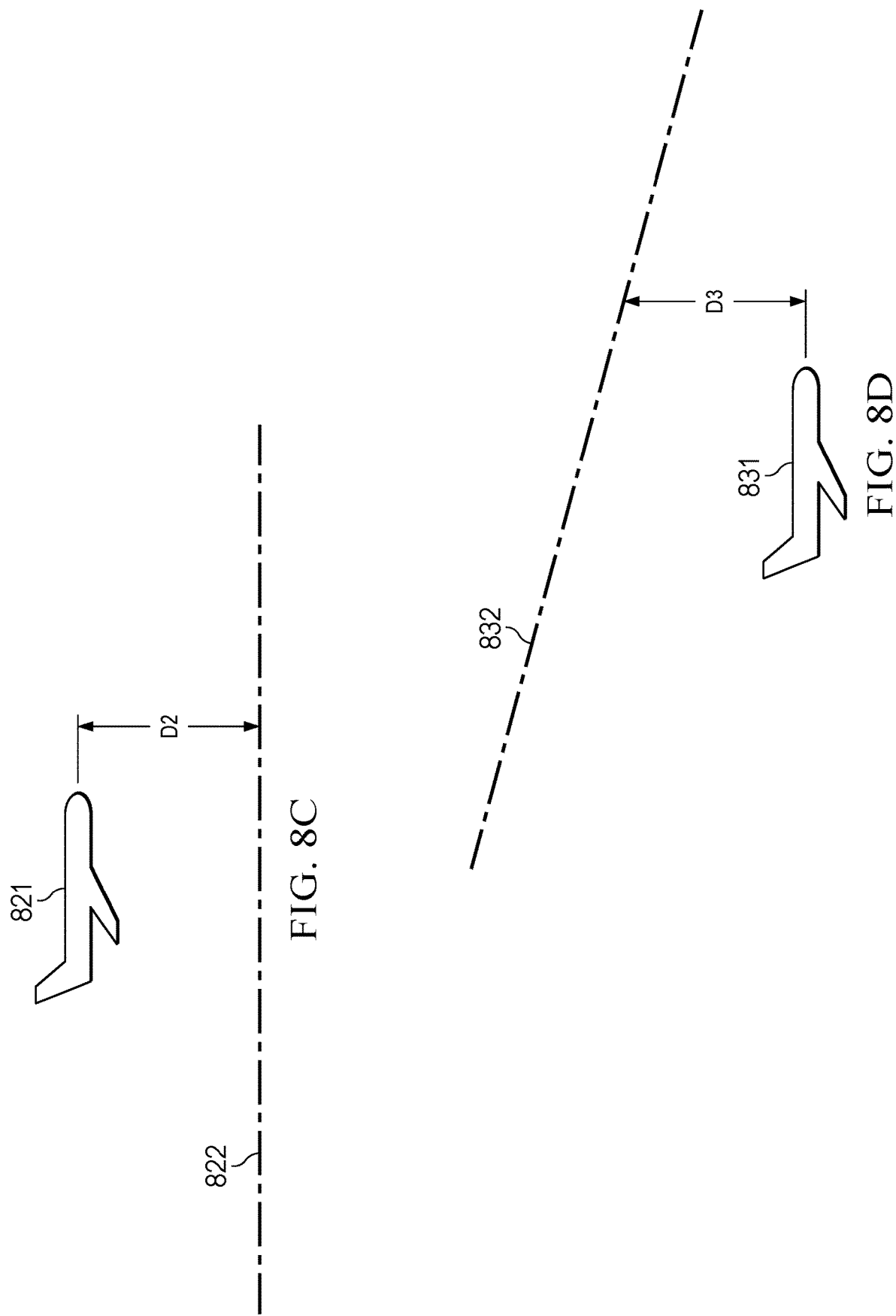

AIRCRAFT RESTRAINT SYSTEM WITH HAPTIC SIGNALING

BACKGROUND

Gaming vests and tactile game controllers are used to provide feedback to players for simulated action such as hits or impacts. Tactile feedback is also used in vehicles in the form of steering wheel shakers that notify a driver of a lane departure warning. Tactile feedback has been used with aircraft in the form of a Tactile Situation Awareness System (TSAS) vest that provides feedback to pilots to indicate a current aircraft pitch or roll or other aircraft condition. However, the existing vehicles and aircraft systems only provide alerts or warnings and do not provide directional feedback to aircrew, such commanding a turn, climb, or decent for navigation or safety. Moreover, the tactile feedback systems for aircraft are not incorporated into the aircraft's restraint system or harness, but are instead included in separate flight gear, such as vests.

SUMMARY

A tactile or haptic signal producing seat belt sleeve or integrated seat belt has tactile signal producing elements arrayed along the sleeve or belt. The elements may be arranged, for example, along the body-facing side of the belts. Haptic signals are created to prevent or limit loss of situational awareness and spatial orientation in relation to navigational inputs. The haptic signals may also increase the navigational ability of pilots or crewmembers. The haptic feedback system may be a retrofit to legacy aircraft via a sleeving system that is attached to an existing harness or restraint system. Each sleeve incorporates a signal-receiving element that allows for the activation of vibration-producing motors embedded in the fabric of the seat belt sleeve or belting. Vibration motors, such as piezoelectric devices, can be used to produce the tactile feedback. The haptic feedback assembly is connected to an interface unit that uses data from aircraft systems to sense, for example, the aircraft altitude and pitch, roll and yaw system. The interface unit generates signal to haptic devices to create appropriate vibrations patterns to the sleeve. The vibrations may be used to indicate directions of turn using output signals from various navigations systems.

The haptic feedback sleeve system can be used on both the shoulder harnesses and lap belt as appropriate to provide the required haptic/vibration patterns feedback to the user.

The tactile feedback in a lap belt sleeve or belting system may be used to vibrate in various patterns. For example, a minimum altitude can be set into the aircraft system and, when the aircraft approaches or descends past the minimum altitude, the lower lap belt sleeve may vibrate at a rate and pulse pattern that signals to the pilot that an action should be taken, such as a climb away from the set altitude or a level off. The haptic feedback system may also be used to signal things such as decision height and go-around points during a IFR approach.

When used in conjunction with a shoulder belt assembly, the lap belt may be used to stimulate vibrations upwards from the lap belt to the shoulder bell in a pulsating vertical motion to indicate a climb. The vibrations may be at such a rate and pulse as to indicate to the pilot a climb rate that should take place. When approaching a set altitude, the vibrations and pulses could be slowed to a stop as the aircraft levels off. This same process can be used to indicate a decent in the opposite direction.

Haptic signals in the shoulder belts and or lap belts can also be used to indicate directions of turn for navigation systems. Using output signals from the navigations systems, for example, during route navigation or during a localizer type approach the vibration and pulsing could indicate on-course turns and vertical guidance to remain on glideslope. The lap belt alone may be used with series of vibrations and pulses to indicate direction and altitudes via the same process.

In other embodiments, tactile feedback in the shoulder harness sleeves could provide pitch, roll, and yaw indications to assist with navigation and level attitudes. The shoulder harness could simulate a vibration from the lap belt sleave upwards to the top of the shoulders to indicate a climb or downwards to indicate a decent. It could also be used to vibrate left or right to indicate turn direction for the aircraft navigation. For example, on an approach the aircraft system could feed a vibration upward or downward to indicate how close and where the aircraft is on the glide path as well as left and right to indicate where the aircraft is in relation to direction to course.

BRIEF DESCRIPTION OF THE DRAWINGS

Figure 1:
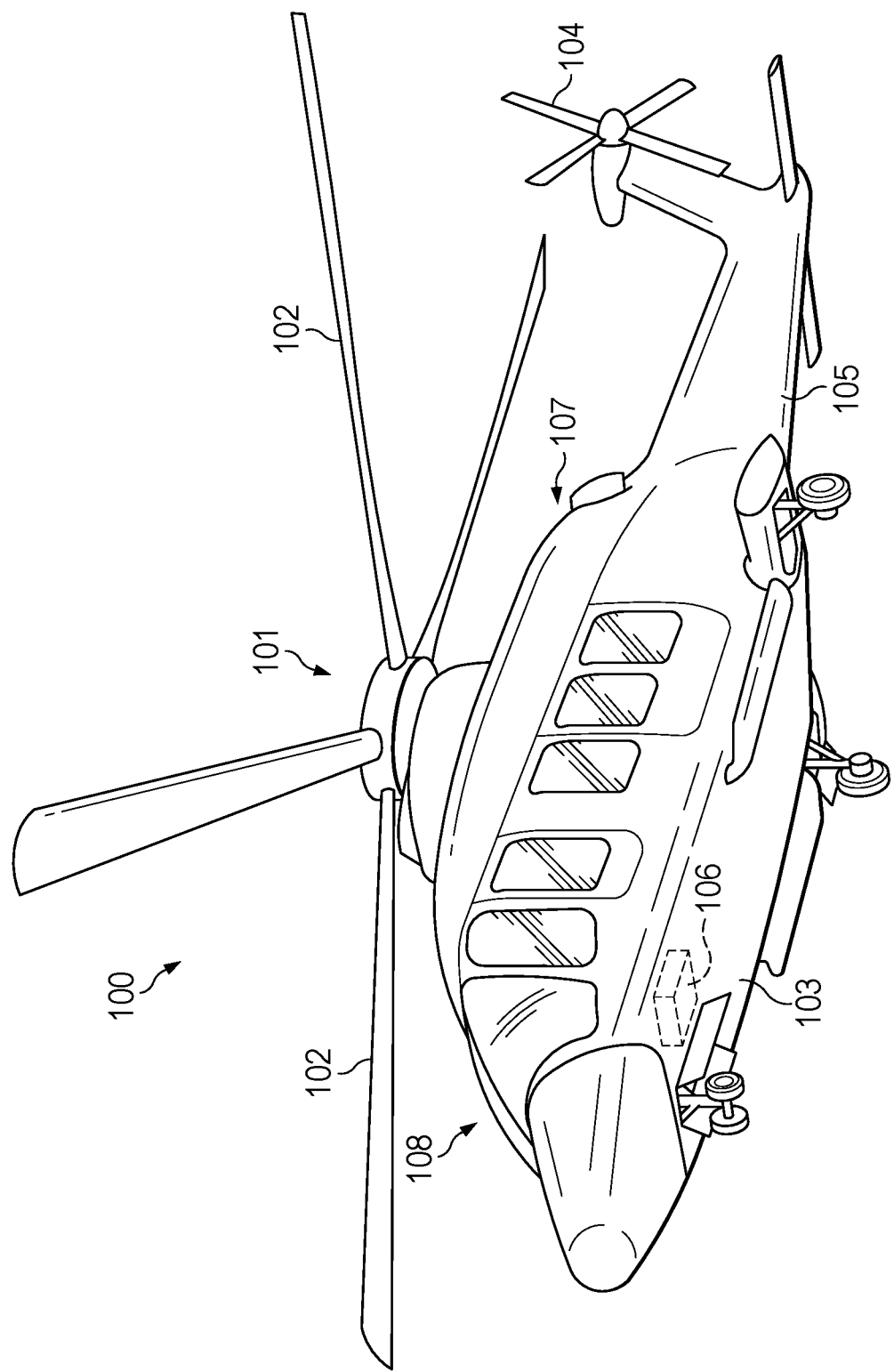

Having thus described the invention in general terms, reference will now be made to the accompanying drawings, which are not necessarily drawn to scale, and wherein:

FIG. 1 depicts an example helicopter rotorcraft that may incorporate an aircraft seat belt system with haptic signaling as disclosed herein.

Figure 2:
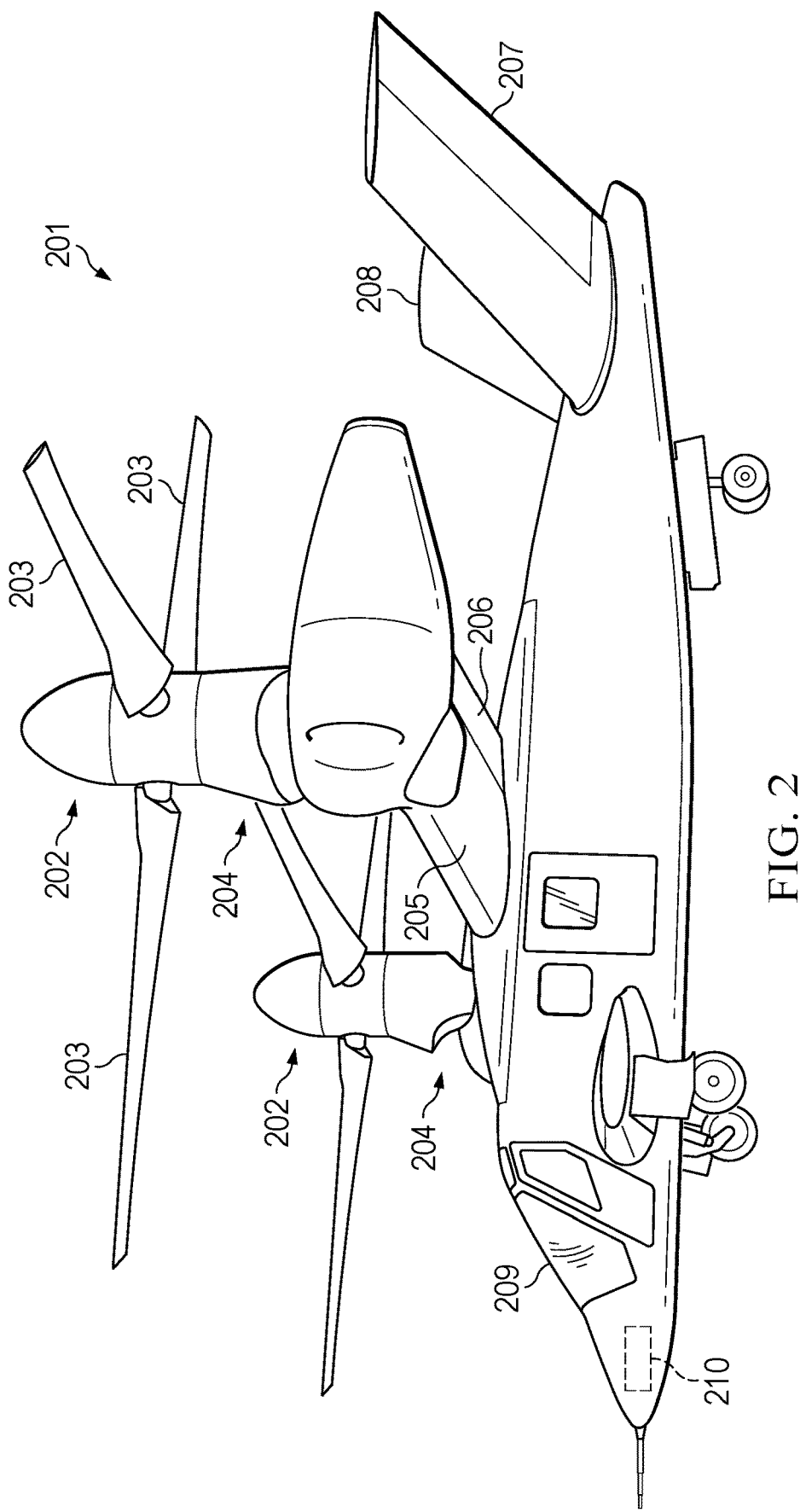

FIG. 2 depicts an example tiltrotor aircraft that may incorporate an aircraft seat belt system with haptic signaling as disclosed herein.

Figure 3:
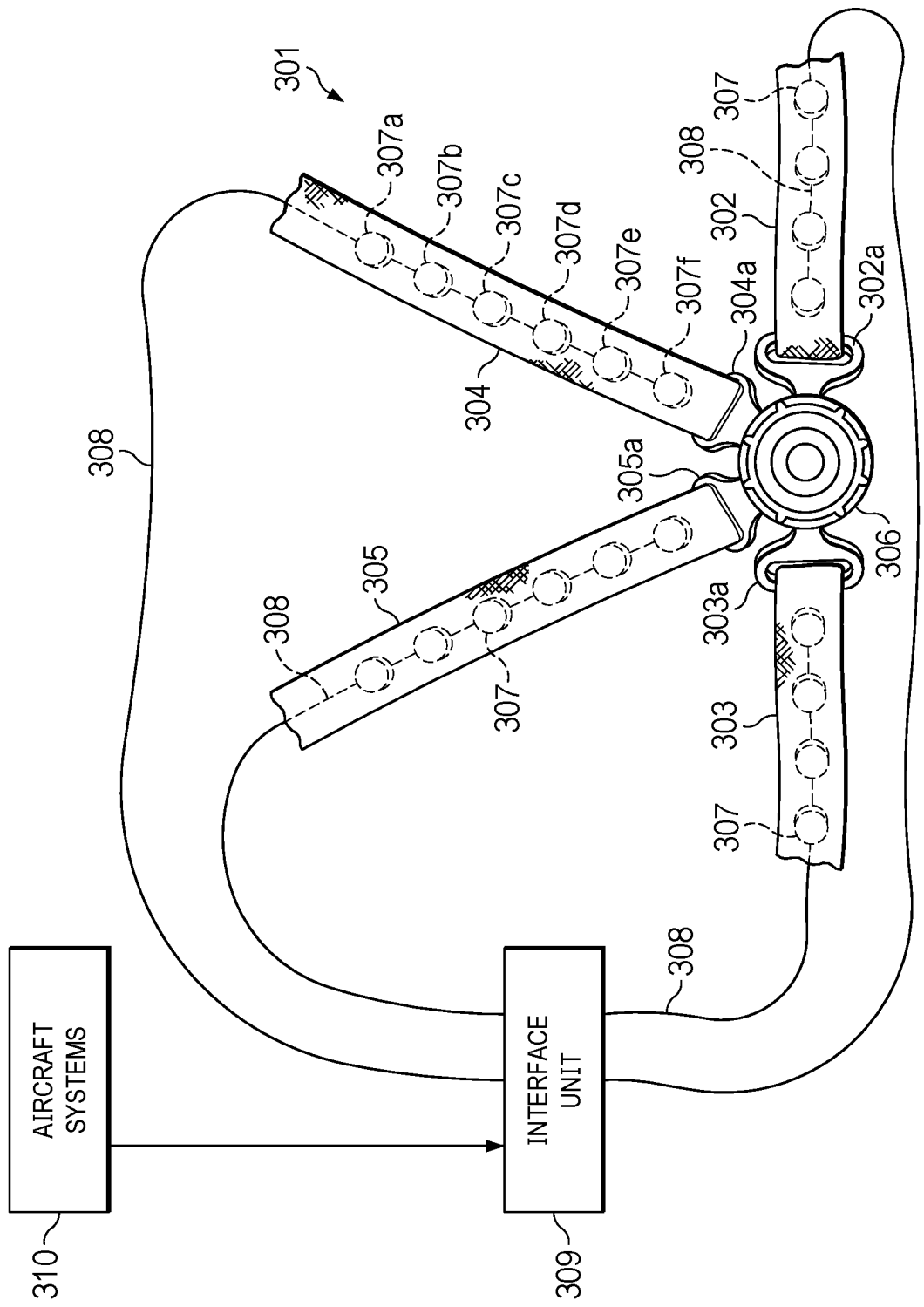

FIG. 3 illustrates an example embodiment of an aircrew restraint system with haptic signaling using seat and shoulder belts.

Figure 4:
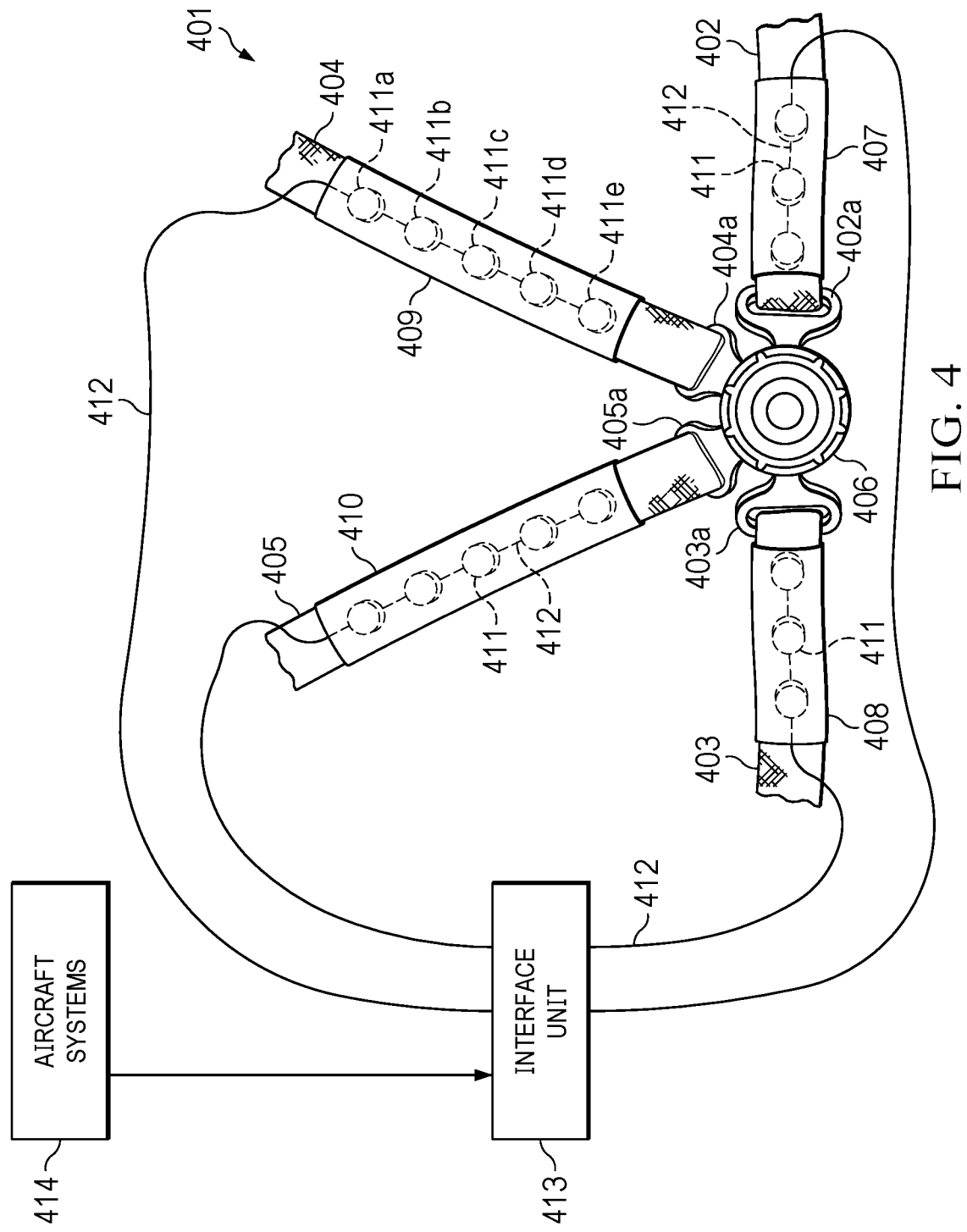

FIG. 4 illustrates an alternative example embodiment of an aircrew restraint system with haptic signaling using sleeves attached to seat and shoulder belts.

Figure 5:
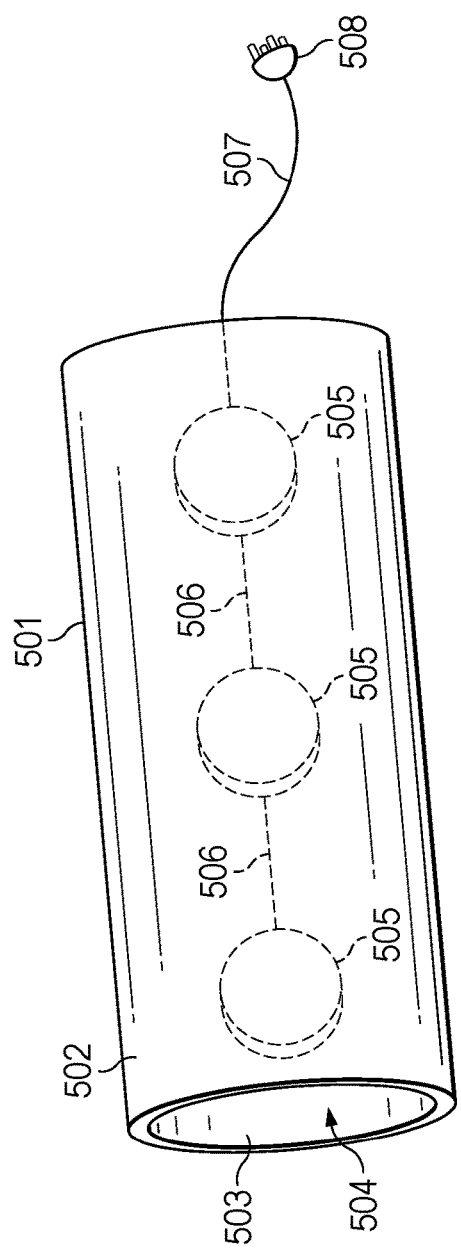

FIG. 5 illustrates an example embodiment of a haptic sleeve.

Figure 6:
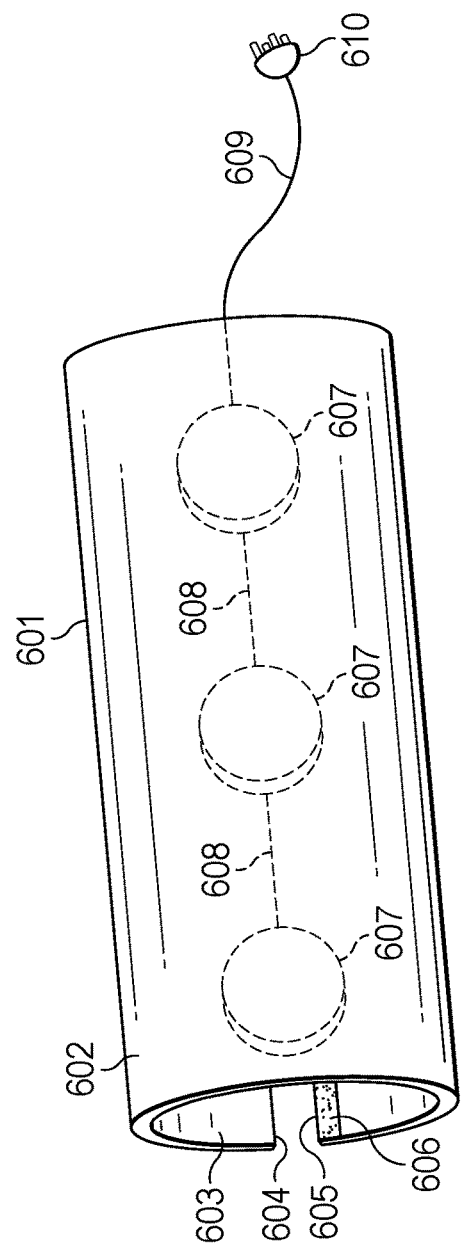

FIG. 6 illustrates an alternative haptic sleeve example embodiment.

Figure 7:
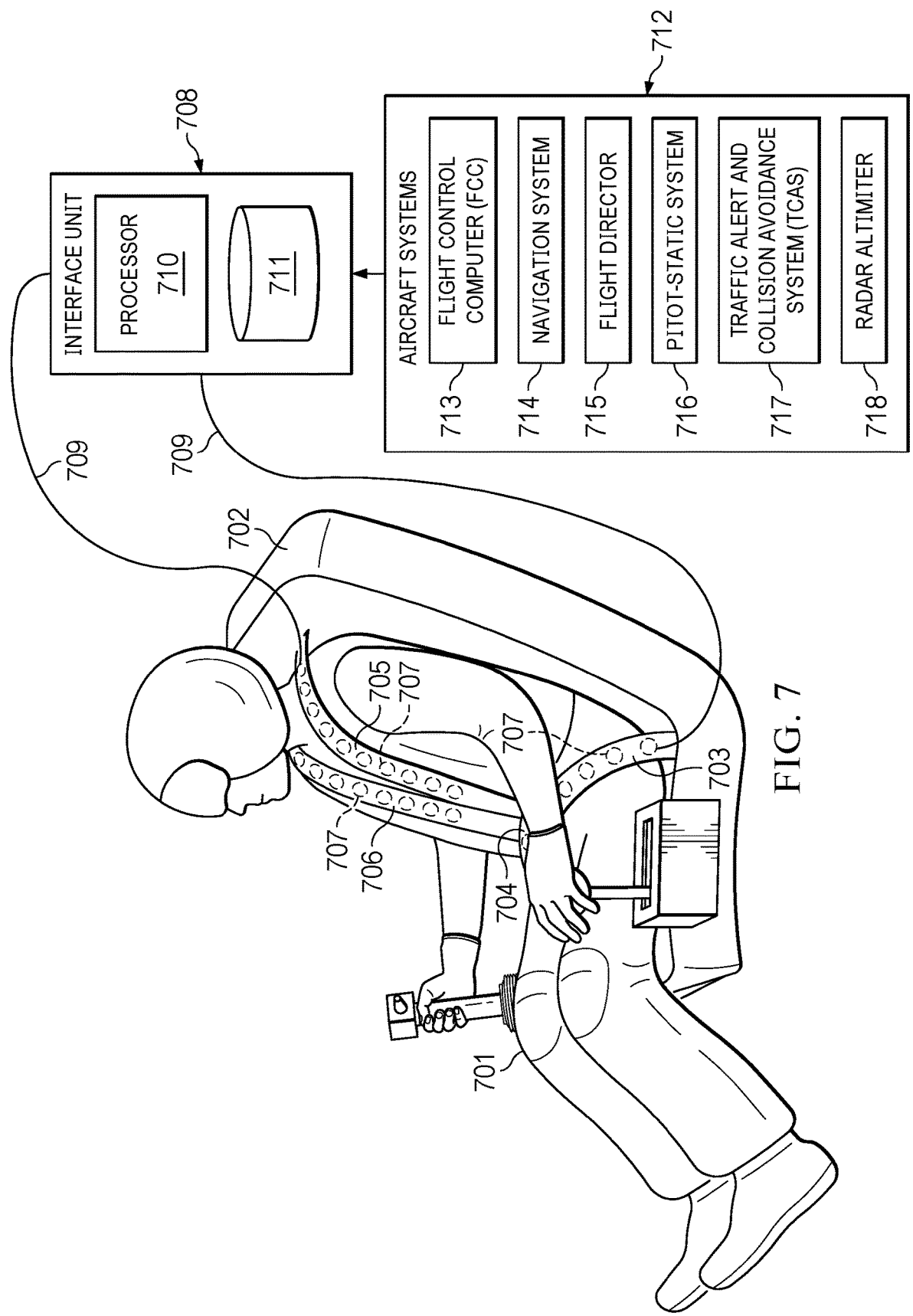

FIG. 7 illustrates a crewmember secured to an aircraft seat using a restraint system having seat belts and shoulder belts with haptic devices.

FIGS. 8A-E illustrate a haptic feedback restraint system that may be used in various aircraft flight conditions.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIGS. 1 and 2 are schematic diagrams of two different aircraft capable of being used with embodiments of an aircraft seat belt system with haptic signaling as disclosed herein. Referring to FIG. 1, a helicopter 100 is schematically illustrated. Helicopter 100 has a main rotor system 101 with a plurality of rotor blades 102. The pitch of rotor blades 102 can be collectively and cyclically manipulated to selectively control direction, thrust, and lift of helicopter 100. For example, the pitch of each main rotor blade 102 may be controlled by a swashplate in order to selectively control the attitude, altitude, and movement of the helicopter 100. The swashplate may be used to collectively and/or cyclically change the pitch of the main rotor blades. Helicopter 100 includes a fuselage 103, an anti-torque system 104, and an empennage 105. Anti-torque system 104 may include a tail rotor, no-tail-rotor (NOTAR), or dual main rotor system. In rotorcraft with a tail rotor, the pitch of each tail rotor blade is collectively changed in order to vary thrust of the anti-torque system, providing directional control of the helicopter 100. The pitch of the tail rotor blades is changed by one or more tail rotor actuators. In some embodiments, a fly-by-wire (FBW) system 106 sends electrical signals to the main rotor actuators or tail rotor actuators to control flight of helicopter 100.

Power is supplied to the main rotor system 101 and the anti-torque system 104 by one or more engines 107. The engines 107 may be controlled according to signals from the FBW system 106. The output of the engine 107 is provided to a driveshaft that is mechanically and operatively coupled to the main rotor system 101 and the anti-torque system 104 through a main rotor transmission and a tail rotor transmission, respectively.

The empennage 105 may have other flight control devices such as horizontal or vertical stabilizers, rudder, elevators, or other control or stabilizing surfaces that are used to control or stabilize flight of the helicopter 100. The fuselage 103 includes a cockpit 108, which includes displays, controls, and instruments. In some embodiments, cockpit 108 is configured to accommodate a pilot or a pilot and co-pilot.

FIG. 2 is a side view of an example tiltrotor aircraft 201. Tiltrotor aircraft 201 has two proprotors 202. Each proprotor 202 has plurality of rotor blades 203 that are driven by an engine 204. Although FIG. 2 shows tiltrotor aircraft 201 in a helicopter mode wherein proprotors 202 are oriented substantially vertical to provide a lifting thrust. It will be understood that in other embodiments, tiltrotor aircraft 201 may operate in an airplane mode wherein proprotors 202 are oriented substantially horizontal to provide a forward thrust. Proprotors 202 may also move between the vertical and horizontal positions during flight as tiltrotor aircraft 201 transitions between a helicopter mode and an airplane mode.

Proprotors 202 and engines 204 are mounted on wings 205, which are attached to a fuselage 206. Wings 205 may provide lift to tiltrotor aircraft 201 in certain flight modes (e.g., during forward flight airplane mode) in addition to supporting rotatable nacelles for engines 204 and proprotor systems 202. Control surfaces 206 on wings 205 and/or control surfaces 207 on a tail section 208 may be used to adjust the attitude of tiltrotor aircraft 201 around the pitch, roll, and yaw axes while in airplane mode. Control surfaces 206 and 207 may be, for example, ailerons, flaps, slats, spoilers, elevators, or rudders that are controlled by cyclic controllers, pedals, or other flight controls within cockpit 209 of fuselage 206.

While particular example aircraft, such as helicopter 101 and tiltrotor aircraft 201, are referred to in the example embodiments, it will be understood that the seat belt system with haptic signaling described herein may be used with any type of aircraft including, without limitation, rotorcraft and fixed wing aircraft, powered and unpowered aircraft, single- and multi-engine aircraft, single- and multi-crew aircraft, and private, commercial, or military aircraft. The seat belt system with haptic signaling described herein may also be used with other types of vehicles, such as cars, trucks, motorcycles, bicycles, all-terrain vehicles, and boats or other watercraft. For example, the haptic devices may be incorporated into seat belts, harnesses, or restraint systems to provide haptic or tactile feedback to a driver, rider, cyclist, helmsman, or other person controlling a vehicle.

FIG. 3 illustrates an example embodiment of an aircrew restraint system 301 for use in an aircraft such as helicopter 101 or tiltrotor aircraft 201. Restraint system 301 is a four-point harness with left and right seat belts 302, 303, left and right shoulder belts 304, 305, and a rotary buckle 306. End fittings 302a, 303a, 304a, 305a on belts 302, 303, 304, 305 are configured to lock into rotary buckle 306 to securely hold a pilot or other crewmember in an aircraft seat. In other configurations, rotary buckle 306 may be replaced by a lift-lever buckle, push-button buckle, or other coupling. Belts 302, 303, 304, 305 may be anchored to an aircraft seat or bulkhead at the ends opposite fittings 302a, 303a, 304a, 305a. Inertia reels, length adjusters, and other fittings may also be attached to one or more belts 302, 303, 304, 305. Although a four-point harness is shown in the example embodiments, it will be understood that any aircraft seat belt system may be adapted to provide the haptic signaling disclosed herein.

In one embodiment, belts 302, 303, 304, 305 include one or more haptic devices 307. A wire harness or cable assembly 308 is used to provide control signals to the haptic devices 307 in each belt 302, 303, 304, 305. An interface unit 309 is attached to the cable assembly 308. Interface unit 309 receives inputs from aircraft systems 310, such as a flight control computer, flight director, or navigation system, and converts those inputs into signals to power and control the haptic devices 307. The haptic devices 307 and cable assembly 308 may be embedded within belts 302, 303, 304, 305 or may be mounted to the front side (i.e., away from the crewmember) or back side (i.e., against crewmember) of the belts 302, 303, 304, 305.

The haptic devices 307 may use technology such as linear resonant actuators (LRA), eccentric rotating mass (ERM) motor, piezoelectric device, or other vibration motors. An LRA is a spring-mass system that vibrates in a linear motion. A coil is suspended by springs and when voltage is applied, the coil generates a magnetic field. The coil interacts with a magnet attached to a mass and, as the magnetic field varies, the magnet and mass move up and down creating a force that is perceived as a vibration. An ERM motor has an unbalanced or irregular mass attached to an axle. When the ERM motor spins, the rotating unbalanced mass causes the motor and attached device to shake. These type of devices are well known for use to provide tactile or haptic feedback in smartphones and game controllers.

Activation of the haptic devices 307 can be used to provide feedback to aircrew by creating a vibration, shaking, or other physical signal against the crewmember's body. Each belt 302, 303, 304, 305 may have one or more haptic device 307. If multiple haptic devices 307 are present in one belt 302, 303, 304, 305, then those haptic devices 307 may each operate independently or as one unit. For example, all of haptic devices 307*a-f* on left shoulder belt 304 may be activated at the same time to create a synchronized vibrating signal to the crewmember that is amplified compared to using a single haptic device 307. Alternatively, the haptic devices 307*a-f* on left shoulder belt 304 may be activated sequentially to create an impression of movement. Haptic devices 307*a-f* may be activated in any order, such as vibrating/shaking each device individually from 307*a* to 307*f* to create a downward movement sensation or vibrating/shaking each device individually from 307*f* to 307*a* to create an upward movement sensation.

Other haptic device 307 activation patterns may also be used. For example, in other embodiments, movement may be suggested by varying the intensity of the vibration in each haptic device 307*a-f*. In this case, all of the haptic devices 307*a-f* may be activated at the same time; however, the intensity (e.g., amplitude and/or frequency) of the vibration may vary across range of haptic devices 307*a-f* so that the vibration of device 307*a* is more intense (e.g., larger amplitude and/or higher frequency) than the intensity of device 307*f*. This change in intensity may be used to suggest an upward motion or command. In other configurations, pairs or groups of haptic device 307*a-f* may be activated in various combinations and/or sequences. By activating different combinations of haptic devices 307, the vibration or shaking may create unique sensations or indications that correspond to various alerts, warnings, commands, or messages to the crewmember. Although the examples described in reference to FIG. 3 refer to activation of the left shoulder belt 304, it will be understood that similar activation of haptic devices 307 may be used in right shoulder belt 305 and seat belts 302, 303.

FIG. 4 illustrates an alternative example embodiment of an aircrew restraint system 401 for use in an aircraft such as helicopter 101 or tiltrotor aircraft 201. Restraint system 401 is a four-point harness with left and right seat belts 402, 403, left and right shoulder belts 404, 405, and a rotary buckle 406. End fittings 402*a*, 403*a*, 404*a*, 405*a* on belts 402, 403, 404, 405 are configured to lock into rotary buckle 406 to securely hold a pilot or other crewmember in an aircraft seat. In other configurations, rotary buckle 406 may be replaced by a lift-lever buckle, push-button buckle, or other coupling. Belts 402, 403, 404, 405 may be anchored to an aircraft seat or bulkhead at the ends opposite fittings 402*a*, 403*a*, 404*a*, 405*a*. Inertia reels, length adjusters, and other fittings may also be attached to one or more belts 402, 403, 404, 405. Although a four-point harness is shown in the example embodiments, it will be understood that any aircraft seat belt system may be adapted to provide the haptic signaling disclosed herein.

Unlike the restraint system 301 shown in FIG. 3, restraint system 401 as shown in FIG. 4 does not have haptic devices 307 attached directly to belts 402, 403, 404, 405. Instead, in restraint system 401, each sleeve 407, 408, 409, 410 has a respective haptic sleeve 407, 408, 409, 410 attached. The haptic sleeves 407, 408, 409, 410 are a separate apparatus that is coupled to a sleeve 407, 408, 409, 410 such as by threading the belt through the sleeve, wrapping the sleeve around the belt, and/or attaching the sleeve to the belt using snaps, buttons, ties, zippers, hook and loop fasteners (e.g., VELCRO®), or other connectors or fasteners. Haptic sleeves 407, 408, 409, 410 allow an existing aircrew restraint system to be modified or upgraded to provide haptic feedback as described herein.

Each of the haptic sleeves 407, 408, 409, 410 include one or more haptic devices 411. A wire harness or cable assembly 412 is used to provide control signals to the haptic devices 411 in each sleeve 407, 408, 409, 410. An interface unit 413 is attached to the cable assembly 412. Interface unit 413 receives inputs from aircraft systems 414, such as a flight control computer, flight director, or navigation system, and converts those inputs into signals to power and control the haptic devices 411. The haptic devices 411 and cable assembly 412 may be embedded within sleeves 407, 408, 409, 410 or may be mounted to an interior or exterior surface of the sleeves 407, 408, 409, 410. As noted for haptic device 307, the haptic devices 411 may also use LRA, ERM, or vibration motor technology to create a vibrating, shaking, or buzzing signal.

Activation of the haptic devices 411 can be used to provide feedback to aircrew by creating a vibration, shaking, or other physical signal against the crewmember's body. Each sleeve 407, 408, 409, 410 may have one or more haptic device 411. If multiple haptic devices 411 are present in one sleeve 407, 408, 409, 410, then those haptic devices 411 may each operate independently or as one unit. For example, all of haptic devices 411*a-e* in sleeve 409 on left shoulder belt 404 may be activated at the same time to create a synchronized vibrating signal to the crewmember. Alternatively, the haptic devices 411*a-e* in sleeve 409 may be activated sequentially to create an impression of movement. Haptic devices 411*a-e* may be activated in any order, such as vibrating/shaking each device individually from 411*a* to 411*e* to create a downward movement sensation or vibrating/shaking each device individually from 411*e* to 411*a* to create an upward movement sensation.

Like the haptic devices 307 on the belts in FIG. 3, haptic devices 411 in sleeves 407, 408, 409, 410 may be activated in different patterns. For example, in other embodiments, movement may be suggested by varying the vibration intensity for each haptic device 411*a-e* individually. In this case, all of the haptic devices 411*a-e* may be activated at the same time; however, the intensity (e.g., amplitude and/or frequency) of the vibration may vary across range of haptic devices 411*a-e* in sleeve 409 so that the vibration of device 411*a* is more intense (e.g., larger amplitude and/or higher frequency) than the intensity of device 411*e*. This change in intensity may be used to suggest an upward motion or command. In other configurations, pairs or groups of haptic device 411*a-e* may be activated in various combinations and/or sequences. By activating different combinations of haptic devices 411, the vibration or shaking may create unique sensations or indications that correspond to various alerts, warnings, commands, or messages to the crewmember. Although the examples described in reference to FIG. 4 refer to activation of haptic devices 411a-e in sleeve 409 on the left shoulder belt 404, it will be understood that similar activation of haptic devices 411 may be used in sleeve 411 on right shoulder belt 405 and in sleeves 407, 408 on seat belts 402, 403.

FIG. 5 illustrates an example haptic sleeve 501 that is configured to be used with a seat belt, shoulder belt, or other type of crewmember harness. Sleeve 501 may be constructed of any appropriate material, such as a flame-resistant material (e.g., NOMEX®). Sleeve 501 has a generally tubular shape with an outside surface 502 and an inside surface 503. An interior channel 504 is defined by the interior surface 503. A seat belt, shoulder belt, or other harness strap may be passed through interior channel 504 to attach sleeve 501 to a restraint system. Additional connectors or fasteners, such as snaps, buttons, ties, zippers, or VELCRO®, may be used to secure the sleeve 501 to a belt or strap.

Haptic sleeve 501 includes one or more haptic devices 505, such as LRA or ERM devices. The haptic devices 505 may be embedded within the material of sleeve 501, such as between outer surface 502 and inner surface 503. Alternatively, the haptic devices 505 may be attached to the outer surface 502 or inner surface 503. A cable assembly 506 is coupled to each haptic device 505 and is used to provide power and control signals to the haptic devices 505. The cable assembly 506 may have an extension portion 507 that can be routed to a control device, such as an interface unit (e.g., unit 309, FIG. 3 or unit 413, FIG. 4). Extension portion 507 includes a connector 508 that may be used to couple the cable assembly 506 to the interface unit. The interface unit or other control device drives the haptic devices 505 and causes them to vibrate or shake at selected amplitudes, frequencies, and patterns.

FIG. 6 illustrates an alternative haptic sleeve 601. Like haptic sleeve 501, sleeve 601 may be constructed of any appropriate material, such as a flame-resistant material. Sleeve 601 has an outside surface 602 and an inside surface 603. Sleeve 601 is a flat sheet having a first edge 604 and a second edge 605. Sleeve 601 can be wrapped around a seat belt, shoulder belt, or other harness strap so that inner surface 603 surrounds the belt or strap. The first edge 604 and the second edge 605 may then be connected using a hook and loop fastener 606 or any other appropriate fastener, such as snaps, buttons, ties, or zippers, to secure sleeve 601 to the belt or strap.

Like sleeve 501, haptic sleeve 601 includes one or more haptic devices 607, such as LRA or ERM devices. The haptic devices 607 may be embedded within the material of sleeve 601, such as between outer surface 602 and inner surface 603. Alternatively, the haptic devices 607 may be attached to the outer surface 602 or inner surface 603. A cable assembly 608 is coupled to each haptic device 607 and is used to provide power and control signals to the haptic devices 607. The cable assembly 608 may have an extension portion 609 that can be routed to a control device, such as an interface unit (e.g., unit 309, FIG. 3 or unit 413, FIG. 4). Extension portion 609 includes a connector 610 that may be used to couple the cable assembly 608 to the interface unit. The interface unit or other control device drives the haptic devices 607 and causes them to vibrate or shake at selected amplitudes, frequencies, and patterns.

FIG. 7 illustrates a crewmember 701 secured to an aircraft seat 702 using a restraint system comprising seat belts 703, 704 and shoulder belts 705, 706. The restraint system includes haptic devices 707 that are either embedded in belts 703, 704, 705, 706 or attached using a haptic sleeve (e.g., sleeve 501, FIG. 5 or sleeve 601, FIG. 6). The haptic devices are coupled to an interface unit 708 by cable assembly 709. In other embodiments, the haptic devices 707 may be coupled to the interface unit 708 or other control mechanism using a wireless connection, such as via a wireless network using a WiFi, BLUETOOTH®, or other technology.

In one embodiment, interface unit 708 includes one or more processors 710 and a memory 711. The processor 710 is configured to execute software instructions stored in memory 711. Processor 710 may be, for example, a microprocessor, microcontroller, programmable logic controller, or similar device. Memory 711 may be, for example, ROM, EEPROM, Flash-EEPROM, magnetic media including disk drives, optical media, or similar device for storing machine readable instructions that are executable by processor 710. The software instructions cause processor 710 to initiate various actions, such as activating selected haptic devices 707, based upon inputs received from aircraft systems 712. In an example embodiment, the aircraft systems 712 providing inputs to interface unit 708 include, without limitation, a Flight Control Computer (FCC) 713, navigation system 714, flight director 715, pitot-static system 716, Traffic Alert and Collision Avoidance System (TCAS) 717, and/or radar altimeter 718.

Interface unit 708 is configured to generate alerts, warnings, commands, or messages for crewmember 701 by activating haptic devices 707, which may shake or vibrate when activated. In response to inputs from aircraft systems 712, interface unit 708 activates some or all of haptic devices 707 in selected patterns that are known to the crewmember 701 through training or an intuitive understanding. For example, the activated haptic devices 707 may provide general information to crewmember 701 indicating that an aircraft is off of a route, is off of a glidepath, or passing a designated altitude. Moreover, the activated haptic devices 707 may provide directional commands to crewmember 701, such as indicating that a turn should be started or stopped or that a descent or climb should be initiated or stopped.

The haptic devices 707 comprise vibrating or shaking motors that are responsive to interface unit 708 or other control system that actuates specific haptic devices 708 in response to aircraft alerts (e.g., altitude too low), aircraft attitude (e.g., current pitch/roll/yaw motions), and/or aircraft direction (e.g., command turns or confirm course). Vibration of the haptic devices 707 provides sensations to the crewmember's torso. The interface unit 708 or control system may be programmed to actuate vibrations or shaking in pre-defined patterns to elicit an appropriate crewmember response.

The haptic or tactile feedback system illustrated in FIG. 7 is part of the aircraft, such as an integral part of the aircraft restraint system or sleeves placed over restraint system straps. The haptic or tactile feedback system may provide information or commands relative to three dimensions, such as turn instructions, altitude warnings, desired rates of climb or descent, and/or glideslope-deviation information. The tactile feedback system may also provide safety of flight information, such as terrain avoidance (e.g., triggered by an alert from radar altimeter 718) or aircraft collision avoidance (e.g., triggered by alerts from TCAS 717).

The information provided by the haptic or tactile feedback system may be used to improve a pilot's special orientation by providing alerts to aircraft flight conditions, such as alerts corresponding to aircraft attitude, altitude, or velocity. The feedback system may be used to reduce the pilot's workload, such as by providing a "feel" for the aircraft's flight condition without requiring focus on instruments. Information from any aircraft system or avionics may be used to generate feedback.

Figure 8A:
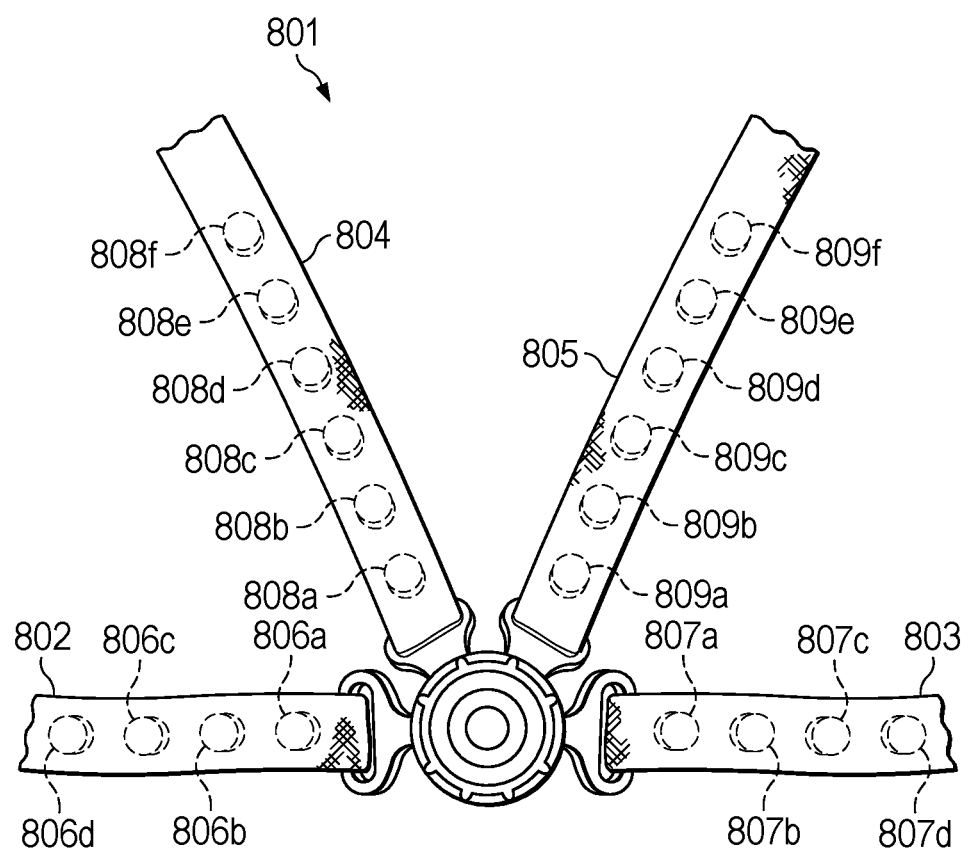

FIG. 8A illustrates a restraint system 801 comprising seat belts 802, 803 and shoulder belts 804, 805 having respective sets of haptic devices 806a-d, 807a-d, 808a-f, 809a-f. For purposes of this illustration, it will be understood that restraint system is viewed relative to the user so that seat belt 802 and shoulder belt 804 are on the crewmember's left side and seat belt 803 and shoulder belt 805 are on the crewmember's right side. The number of haptic devices shown in FIG. 8A are for illustration only (i.e., four haptic devices in each seat belt and six haptic devices in each shoulder belt). It will be understood that any number of haptic devices may be included in each seat and shoulder belt or other harness in a restraint system based upon design considerations, such as space available, redundancy, the interface unit's ability to control multiple haptic devices, desired positioning relative to the user or crewmember, desired distance between devices, or other considerations. Haptic devices 806a-d, 807a-d, 808a-f, 809a-f in restraint system 801 may be controlled by a device such as interface unit 708 (FIG. 7).

Figure 8B:
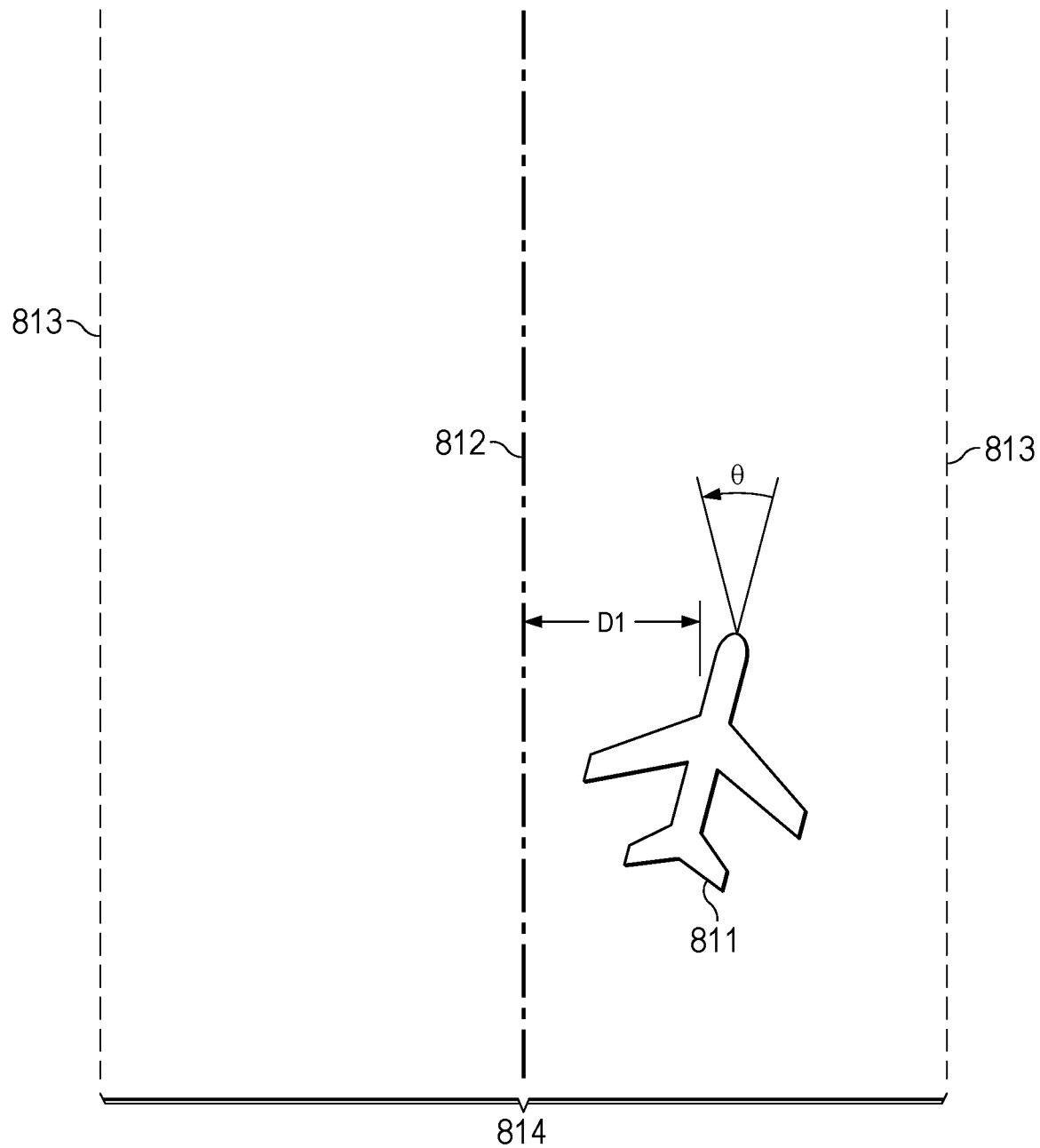

FIG. 8B illustrates a first flight condition in which an aircraft 811 is flying to the right of a desired flight path 812. A crewmember of aircraft 811, such as a pilot, may use restraint system 801 having haptic devices 806a-d, 807a-d, 808a-f, 809a-f. Systems on aircraft 811, such as FCC 713, navigation system 714, or flight director 715 (FIG. 7), may determine that aircraft 811 is not on the desired flight path 812 and may provide relevant feedback to a crewmember, such as a pilot of aircraft 811, using haptic devices in restraint system 801. For example, one or more haptic devices 806a-d, 808a-f on left seat belt 802 and/or left shoulder belt 804 may be activated to inform the crewmember that the desired path 812 is to the left and/or to direct the crewmember to initiate a left turn. In this example, the haptic signal functions as a "fly to" instruction or command and the crewmember may be trained to fly toward the direction that is activated. The haptic signal may be modulated in amplitude, frequency, or other parameters to provide additional information, such as the amount of course error. Amplitude modulation of the haptic signal may be, for example, variations from a soft vibration to a strong vibration. Frequency modulation of the haptic signal may be, for example, variations in the vibration frequency of the individual haptic devices and/or a rate at which the vibration is turned on and off (e.g., vibration pulses). The course error signal may correspond to a lateral distance D1 that aircraft 811 is off course or a degree θ of heading change required to correct back on course (e.g., more violent shaking for larger values of D1 or θ).

Alternatively, one or more haptic devices 807a-d, 809a-f on right seat belt 803 and/or right shoulder belt 805 may be activated to direct the crewmember to initiate a left turn toward desired path 812. In this configuration, the haptic signal functions as an avoidance command or instruction (similar to a push on the crewmember's right side), and the crewmember may be trained to fly away from the direction that is activated.

Additional navigation feedback that is not limited to a particular may be provided to the crewmember. For example, an area may be designated using geofencing in a navigation system. The area may be designated as an area to avoid or an operations area, for example. If the aircraft is approaching an avoidance area, then the haptic feedback system may vibrate or shake the restraint system to notify the crewmember that they are approaching a restricted area. Similarly, if an aircraft is working within a designated area, then the restraint system may shake or vibrate to notify the crewmember when they approach a boundary to prevent the aircraft from spilling out of the designated area. Geofenced areas may also be designated in connection with a desired flight path 812. For example, geofences 813 may be designated within a certain distance of path 812. The feedback system may be configured to notify the crewmember only when aircraft 811 approaches or crosses geofences 813. Such a configuration would allow aircraft 811 to operate within a route or course 814 without requiring strict adherence to flight path 812.

FIG. 8C illustrates a second flight condition in which an aircraft 821 is flying above a desired or commanded altitude 822. Systems on aircraft 821, such as FCC 713, navigation system 714, pitot-static system 716, or radar altimeter 718 (FIG. 7), may determine that aircraft 821 is not at a desired altitude 822 and may provide feedback to a crewmember using haptic devices in restraint system 801. For example, one or more haptic devices 806a-d, 807a-d on seat belts 802, 803 may be activated to inform the crewmember that the desired altitude 822 is below aircraft 821 and/or to direct the crewmember to initiate a descent. In this example, the haptic signal functions as a "fly to" instruction, and the crewmember may be trained to fly toward the direction that is activated. The haptic signal may be modulated in amplitude, frequency, or other parameters to provide additional information, such as the amount of altitude error. The altitude error signal may correspond to a vertical distance D2 that aircraft 821 is off altitude. In other embodiments, the altitude error signal may correspond to a suggested rate of descent required to correct back onto the assigned altitude (e.g., more violent shaking for larger values of D2 or rate of descent.).

In other embodiments (not shown), similar haptic signals may be used to indicate that aircraft 821 is below a desired altitude, such as shaking haptic devices 808d-f, 809d-f on shoulder belts 804, 805 to inform the crewmember that the desired altitude is to the above aircraft 821 and/or to direct the crewmember to initiate a climb.

The haptic devices may also be used for safety of flight warnings. For example, one or more haptic devices haptic devices 806a-d, 807a-d on seat belts 802, 803 may be activated to warn the crewmember against descending further (e.g., below a minimum or commanded altitude) and/or to warn that a current rate of descent is excessive.

FIG. 8D illustrates a third flight condition in which an aircraft 831 is flying below a desired glideslope 832, such as during an instrument or ground-controlled approach to an airport. Systems on aircraft 821, such as navigation system 714, flight director 715, pitot-static system 716, and/or radar altimeter 718 (FIG. 7), may determine that aircraft 821 is not on a desired glideslope 832 and may provide feedback to a crewmember using haptic devices in restraint system 801. For example, one or more haptic devices 808d-f, 809d-f on shoulder belts 804, 805 may be activated to inform the crewmember that the desired glideslope 832 is above aircraft 831 and/or to direct the crewmember to slow the aircraft's descent. The haptic signal may be modulated in amplitude, frequency, or other parameters to provide additional information, such as the vertical distance D3 that aircraft 821 is below glideslope or may correspond to a suggested rate of descent required to correct back onto the assigned altitude (e.g., more violent shaking for larger values of D3).

Similar to the use in FIG. 8D, the haptic devices may also be used for safety of flight warnings relative to a glideslope or other approach parameters. For example, one or more haptic devices haptic devices 806a-d, 807a-d on seat belts 802, 803 may be activated to warn the crewmember against descending below the glideslope 832 and/or below a decision height and/or to warn that a current rate of descent is excessive.

Figure 8E:
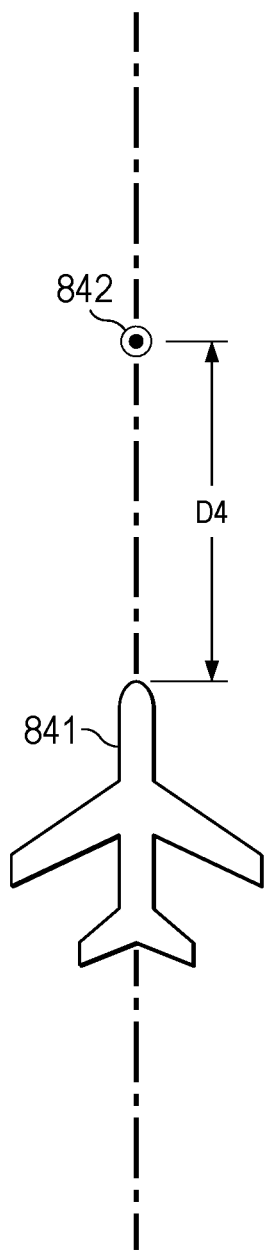

FIG. 8E illustrates a fourth flight condition in which an aircraft 841 is flying toward a location 842, such as a fix, waypoint, intersection, initial point, or other navigation point. Systems on aircraft 841, such as navigation system 714 or flight director 715 (FIG. 7), may determine that aircraft 841 is approaching, at, or past location 842 and may provide relevant feedback to a crewmember using haptic devices in restraint system 801. For example, one or more haptic devices 806a-d, 807a-d on seat belts 802, 803 or 808a-f, 809a-f on shoulder belts 804, 805 may be activated to inform the crewmember that a selected location 842 is approaching. The haptic signal may be modulated in amplitude, frequency, or other parameters to provide additional information, such as a remaining distance D4 location 842 (e.g., stronger vibrations as the distance D4 decreases). Haptic signals may also indicate arrival at or passing location 842.

The haptic feedback system could be used not only in aircraft but in all vehicles and may receive wireless control signals (e.g., via BLUETOOTH®) from smartphones to backpacks or belts for personal navigation use.

In one arrangement, a restraint system for an aircraft includes a first and a second lap belt and a first and a second shoulder belt. One or more haptic devices are coupled to each lap belt and each shoulder belt. An interface unit is coupled to each haptic device and is configured to control activation of each haptic device, wherein the interface unit is coupled to one or more aircraft systems and configured to activate the haptic devices in response to data received from the aircraft systems. The one or more haptic devices may be embedded within the first and second lap belts and within the first and second shoulder belts. The one or more haptic devices may be attached to a surface of the first and second lap belts and the first and second shoulder belts.

The restraint system may further comprise four haptic device sleeves, wherein each sleeve is attached to a selected lap belt or shoulder belt, and wherein the one or more haptic devices are embedded within the haptic device sleeves.

The restraint system may further comprise four haptic device sleeves, wherein each sleeve is attached to a selected lap belt or shoulder belt, and wherein the one or more haptic devices are attached to a surface of the haptic device sleeves.

The interface unit may be configured to control activation of each haptic device individually or may be configured to control activation of selected groups of haptic devices in each lap belt and shoulder belt. The interface unit is configured to control at least one of an amplitude and a frequency of activated haptic devices.

The aircraft systems may comprise one or more of a flight control computer, a navigation system, a flight director, a pitot-static system, a Traffic Alert and Collision Avoidance System (TCAS), and a radar altimeter.

The interface unit may be configured to activate selected haptic devices to indicate that the aircraft is not at a designated altitude. The interface unit may be configured to activate selected haptic devices to indicate that the aircraft is not on a designated flight path or course. The interface unit may be configured to activate selected haptic devices to indicate that the aircraft is not on a designated glideslope.

The interface unit may be configured to activate selected haptic devices to indicate that the aircraft's position relative to a designated location.

In another arrangement, a haptic feedback system for an aircraft includes a first sleeve attached to a first restraint harness strap, a second sleeve attached to a second restraint harness strap, and one or more haptic devices in each of the first sleeve and the second sleeve. The haptic devices are configured to receive activation signals from a control unit in response to an aircraft fight condition. The haptic feedback system may further comprise a third sleeve attached to a third restraint harness strap, a fourth sleeve attached to a fourth restraint harness strap, and one or more additional haptic devices in each of the third sleeve and the fourth sleeve. The additional haptic devices are configured to receive activation signals from a control unit in response to an aircraft fight condition. The first and second restraint harness straps may be shoulder belts, and the third and fourth restraint harness straps may be lap belts.

The control unit may be configured to activate each haptic device individually and to activate selected groups of haptic devices in each sleeve. The control unit may be configured to receive inputs from one or more of a flight control computer, a navigation system, a flight director, a pitot-static system, a Traffic Alert and Collision Avoidance System (TCAS), and a radar altimeter. The control unit may be configured to activate selected haptic devices to indicate that the aircraft is not at a designated altitude, not on a designated flight path, or not on a designated glideslope. The control unit may be configured to activate selected haptic devices to indicate that the aircraft's position relative to a designated location or boundary.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A restraint system for an aircraft, comprising:
 a first and a second lap belt;
 a first and a second shoulder belt;
 one or more haptic devices physically configured on each lap belt and each shoulder belt;
 an interface unit coupled to each haptic device and configured to control activation of each haptic device, wherein the interface unit is coupled to one or more aircraft systems and configured to activate the haptic devices in response to data received from the aircraft systems.

2. The restraint system of claim 1, wherein the one or more haptic devices are embedded within the first and second lap belts and within the first and second shoulder belts.

3. The restraint system of claim 1, wherein the one or more haptic devices are attached to a surface of the first and second lap belts and the first and second shoulder belts.

4. The restraint system of claim 1, further comprising:
four haptic device sleeves, wherein each sleeve is attached to a selected lap belt or shoulder belt, and wherein the one or more haptic devices are embedded within the haptic device sleeves.

5. The restraint system of claim 1, further comprising:
four haptic device sleeves, wherein each sleeve is attached to a selected lap belt or shoulder belt, and wherein the one or more haptic devices are attached to a surface of the haptic device sleeves.

6. The restraint system of claim 1, wherein the interface unit is configured to control activation of each haptic device individually.

7. The restraint system of claim 1, wherein the interface unit is configured to control activation of selected groups of haptic devices in each lap belt and shoulder belt.

8. The restraint system of claim 1, wherein the interface unit is configured to control at least one of an amplitude and a frequency of activated haptic devices.

9. The restraint system of claim 1, wherein the aircraft systems comprise one or more of a flight control computer, a navigation system, a flight director, a pitot-static system, a Traffic Alert and Collision Avoidance System (TCAS), and a radar altimeter.

10. The restraint system of claim 1, wherein the interface unit is configured to activate selected haptic devices to indicate that the aircraft is not at a designated altitude.

11. The restraint system of claim 1, wherein the interface unit is configured to activate selected haptic devices to indicate that the aircraft is not on a designated flight path or course.

12. The restraint system of claim 1, wherein the interface unit is configured to activate selected haptic devices to indicate that the aircraft is not on a designated glideslope.

13. The restraint system of claim 1, wherein the interface unit is configured to activate selected haptic devices to indicate that the aircraft's position relative to a designated location.

14. A haptic feedback system for an aircraft, comprising:
a first sleeve attached to a first restraint harness strap;
a second sleeve attached to a second restraint harness strap; and
one or more haptic devices configured in each of the first sleeve and the second sleeve, wherein the haptic devices are configured to receive activation signals from a control unit in response to an aircraft fight condition.

15. The haptic feedback system for an aircraft of claim 14, further comprising:
a third sleeve attached to a third restraint harness strap;
a fourth sleeve attached to a fourth restraint harness strap; and
one or more additional haptic devices in each of the third sleeve and the fourth sleeve, wherein the additional haptic devices are configured to receive activation signals from a control unit in response to an aircraft fight condition.

16. The haptic feedback system of claim 15, wherein the first and second restraint harness straps are shoulder belts, and wherein the third and fourth restraint harness straps are lap belts.

17. The haptic feedback system of claim 14, wherein the control unit is configured to activate each haptic device individually and to activate selected groups of haptic devices in each sleeve.

18. The haptic feedback system of claim 14, wherein the control unit is configured to receive inputs from one or more of a flight control computer, a navigation system, a flight director, a pitot-static system, a Traffic Alert and Collision Avoidance System (TCAS), and a radar altimeter.

19. The haptic feedback system of claim 14, wherein the control unit is configured to activate selected haptic devices to indicate that the aircraft is not at a designated altitude, not on a designated flight path, or not on a designated glideslope.

20. The haptic feedback system of claim 14, wherein the control unit is configured to activate selected haptic devices to indicate that the aircraft's position relative to a designated location or boundary.

* * * * *